(12) United States Patent
Kato et al.

(10) Patent No.: US 9,631,706 B2
(45) Date of Patent: Apr. 25, 2017

(54) AUTOMATIC TRANSMISSION

(71) Applicant: AISIN AW CO., LTD., Anjo-shi, Aichi-ken (JP)

(72) Inventors: Hiroshi Kato, Kariya (JP); Nobutada Sugiura, Nishio (JP); Hiroaki Sanji, Takahama (JP); Shota Oue, Nishio (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 15/101,114

(22) PCT Filed: Jan. 9, 2015

(86) PCT No.: PCT/JP2015/050437
§ 371 (c)(1),
(2) Date: Jun. 2, 2016

(87) PCT Pub. No.: WO2015/105165
PCT Pub. Date: Jul. 16, 2015

(65) Prior Publication Data
US 2016/0305510 A1 Oct. 20, 2016

(30) Foreign Application Priority Data

Jan. 10, 2014 (JP) .................................. 2014-003401

(51) Int. Cl.
*F16H 3/66* (2006.01)
*F16H 61/02* (2006.01)
*F16H 3/44* (2006.01)

(52) U.S. Cl.
CPC ........... *F16H 3/66* (2013.01); *F16H 61/0265* (2013.01); *F16H 2003/442* (2013.01);
(Continued)

(58) Field of Classification Search
None
See application file for complete search history.

(56) References Cited

U.S. PATENT DOCUMENTS 4,229,996 A * 10/1980 Hildebrand ........... F16H 47/085
475/55
8,043,190 B2 * 10/2011 Phillips .................... F16H 3/66
475/276
(Continued)

FOREIGN PATENT DOCUMENTS

JP S49-105066 A 10/1974
JP H09-264387 A 10/1997
(Continued)

OTHER PUBLICATIONS

Apr. 14, 2015 Search Report issued in International Patent Application No. PCT/JP2015/050437.

*Primary Examiner* — Justin Holmes
(74) *Attorney, Agent, or Firm* — Oliff PLC (57) ABSTRACT

An automatic transmission, wherein the reduced-speed rotation output portion and the first brake are disposed on one side, in the axial direction, of the planetary gear set; the output member is disposed on the other side, in the axial direction, of the planetary gear set; the first clutch, the second clutch, and the second brake are disposed on a side of the output member opposite to the planetary gear set in the axial direction; the first brake is disposed on an outer peripheral side of the reduced-speed rotation output portion; and the second brake is disposed on an outer peripheral side of the first clutch and the second clutch.

16 Claims, 3 Drawing Sheets

(52) U.S. Cl.
CPC ............... *F16H 2200/0052* (2013.01); *F16H 2200/201* (2013.01); *F16H 2200/2041* (2013.01); *F16H 2200/2043* (2013.01)

(56) References Cited

U.S. PATENT DOCUMENTS

| | | | |
|---|---|---|---|
| 8,419,585 B2* | 4/2013 | Wittkopp | ................ F16H 3/666 |
| | | | 475/269 |
| 2010/0035718 A1 | 2/2010 | Saitoh | |
| 2011/0306459 A1 | 12/2011 | Phillips et al. | |
| 2012/0065019 A1* | 3/2012 | Hart | ........................ F16H 3/663 |
| | | | 475/271 |

FOREIGN PATENT DOCUMENTS

| | | |
|---|---|---|
| JP | 2010-038333 A | 2/2010 |
| WO | 2013/159987 A1 | 10/2013 |

* cited by examiner

|  | C-1 | C-2 | B-1 | B-2 | B-3 |
|---|---|---|---|---|---|
| 1st | ○ |  |  | ○ |  |
| 2nd | ○ |  | ○ |  |  |
| 3rd | ○ |  |  |  | ○ |
| 4th | ○ | ○ |  |  |  |
| 5th |  | ○ |  |  | ○ |
| 6th |  | ○ | ○ |  |  |
| Rev |  |  |  | ○ | ○ |

FIG.3

AUTOMATIC TRANSMISSION

BACKGROUND

The technology relates to an automatic transmission to be mounted on a vehicle or the like, and in particular to an automatic transmission that includes a reduced-speed rotation output portion, a planetary gear set, first and second clutches, and first and second brakes to enable multi-stage speed change.

In recent years, it has been desired that automatic transmissions to be mounted on vehicles or the like should provide a multiplicity of speeds in view of the request to improve the fuel efficiency. Among such automatic transmissions, there is proposed an automatic transmission that includes a speed-reduction planetary gear that may output reduced-speed rotation obtained by reducing the speed of input rotation input to an input shaft and a so-called two-storied planetary gear set in which a plurality of planetary gears are combined with each other in the radial direction to provide six forward speeds and a reverse speed (see International Patent Application Publication No. 2013/159987).

SUMMARY

In the automatic transmission of International Patent Application Publication No. 2013/159987, a counter gear that outputs rotation is disposed between the speed-reduction planetary gear and the two-storied planetary gear set in the axial direction, and a member that transfers the reduced-speed rotation extends to the two-storied planetary gear set which is located away from the speed-reduction planetary gear. Therefore, the member which transfers the reduced-speed rotation is elongated. In addition, a brake that locks rotation of a common carrier is disposed on the outer peripheral side of the two-storied planetary gear set. That is, the brake is disposed on the outer peripheral side of the planetary gear set which is large in the radial direction. This hinders making the automatic transmission compact in the radial direction.

An exemplary aspect of the disclosure provides an automatic transmission in which a reduced-speed rotation output portion and a planetary gear set are disposed close to each other and a plurality of clutches and brakes are disposed as appropriate so that the automatic transmission can be made compact.

An exemplary aspect of the disclosure provides an automatic transmission including: a reduced-speed rotation output portion that outputs input rotation of an input member with a speed of the input rotation reduced; a planetary gear set that has a first sun gear, an integral intermediate gear in which a first ring gear is formed on an inner peripheral side and a second sun gear is formed on an outer peripheral side, a second ring gear, and a common carrier that rotatably supports a first pinion and a second pinion, the first pinion being meshed with the first sun gear and the first ring gear, and the second pinion being meshed with the second sun gear and the second ring gear and disposed so as to be at least partially superposed on the first pinion in an axial direction as viewed from a radial direction; a first clutch capable of engaging the first sun gear and the input member with each other; a second clutch capable of engaging the common carrier and the input member with each other; a first brake capable of locking rotation of the intermediate gear; a second brake capable of locking rotation of the common carrier; and an output member drivably coupled to the second ring gear to output rotation, wherein the reduced-speed rotation output portion and the first brake are disposed on one side, in the axial direction, of the planetary gear set; the output member is disposed on the other side, in the axial direction, of the planetary gear set; the first clutch, the second clutch, and the second brake are disposed on a side of the output member opposite to the planetary gear set in the axial direction; the first brake is disposed on an outer peripheral side of the reduced-speed rotation output portion; and the second brake is disposed on an outer peripheral side of the first clutch and the second clutch.

Consequently, the reduced-speed rotation output portion is disposed on one side, in the axial direction, of the planetary gear set, and the output member is disposed on the other side, in the axial direction, of the planetary gear set. Thus, the reduced-speed rotation output portion and the planetary gear set can be disposed close to each other without the output member interposed between the reduced-speed rotation output portion and the planetary gear set in the axial direction, which makes it possible to shorten the member which transfers reduced-speed rotation and make the automatic transmission compact and lightweight. In addition, the first brake is disposed on the outer peripheral side of the reduced-speed rotation output portion, and the second brake is disposed on the outer peripheral side of the first clutch and the second clutch. Thus, the automatic transmission can be made compact in the radial direction without disposing the first brake and the second brake on the outer peripheral side of the planetary gear set.

DETAILED DESCRIPTION OF EMBODIMENTS

<First Embodiment>

Figure 1:
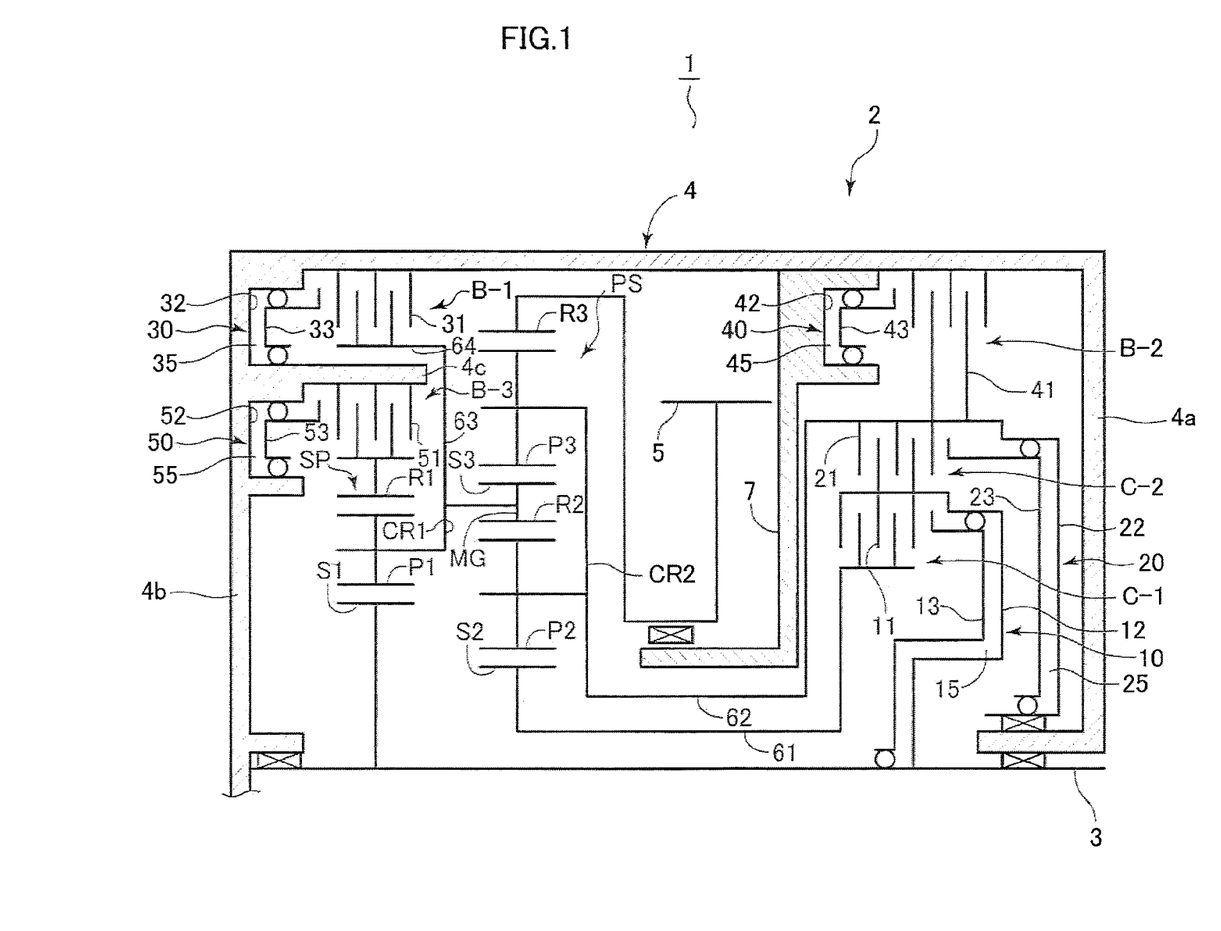
FIG. 1 is a schematic sectional view illustrating an automatic transmission according to a first embodiment.

An embodiment will be described below with reference to FIGS. 1 and 2. As illustrated in FIG. 1, an automatic transmission 1, which is suitable to be mounted on front-engine front-drive (FF) vehicles, for example, has a transmission case (case) 4 to which a housing case etc. that contains a torque converter (not illustrated) therein is connected, and a speed change mechanism 2 and a counter shaft and a differential device (not illustrated) are disposed in the transmission case 4. The speed change mechanism 2 is disposed on an axis centered on an input shaft 3 that is coaxial with an output shaft of an engine (not illustrated), for example. In addition, the counter shaft (not illustrated) is disposed on an axis that is parallel to the input shaft 3. Furthermore, the differential gear device (not illustrated) is disposed so as to have left and right axles on an axis that is parallel to the counter shaft. The input shaft 3, the counter shaft, and the left and right axles are in a dog-legged positional relationship as viewed from a side. In addition, in general, the counter shaft and the differential device are disposed at a position adjacent to the torque converter. That is, the counter shaft and the differential device are disposed at a position at which the counter shaft and the differential device overlap the input side of the input shaft 3 in the axial direction.

In the automatic transmission which is suitable to be mounted on FF vehicles described below, the left-right direction in the drawings corresponds to the left-right direction of the actual vehicle. Depending on the direction in which the automatic transmission is mounted on the vehicle, the right side in the drawings may correspond to the left side of the vehicle, and the left side in the drawings may correspond to the right side of the vehicle. However, simple use of the "right side" and the "left side" in the following description refers to the "right side" and the "left side", respectively, in the drawings.

First, the arrangement structure of various portions of the speed change mechanism 2 of the automatic transmission 1 will be roughly described with reference to FIG. 1. The speed change mechanism 2 of the automatic transmission 1 includes the input shaft (input member) 3 which is connected to a drive source such as the engine via the torque converter or the like (not illustrated) and to which rotation of the engine is input. Both ends of the input shaft 3 are rotatably supported by sidewalls 4a and 4b of the transmission case 4. A two-storied planetary gear set PS is disposed on the input shaft 3, and centered on the input shaft 3. A speed-reduction planetary gear SP and a third brake B-3, which serve as the reduced-speed rotation output portion, are disposed on the left side (one side in the axial direction) of the planetary gear set PS. A first brake B-1 is disposed on the outer peripheral side of the speed-reduction planetary gear SP and the third brake B-3. A counter gear (output member) 5 and a support wall 7 are disposed on the right side (the other side in the axial direction) of the planetary gear set PS. The support wall 7 is provided to extend inward from the inner peripheral surface of the transmission case 4, and formed in a hollow circular plate shape.

The counter gear (output member) 5, which is disposed on the left side of the support wall 7, is rotatably supported on the inner peripheral side of the support wall 7. A first clutch C-1, a second clutch C-2, and a second brake B-2 are disposed on the right side with respect to the counter gear 5 (on the side opposite to the planetary gear set PS with respect to the counter gear 5 in the axial direction) and between the sidewall 4a, on the input side, of the transmission case 4 and the counter gear 5. The first clutch C-1, the second clutch C-2, and the second brake B-2 are arranged in this order from the inner peripheral side. That is, the first clutch C-1, the second clutch C-2, and the second brake B-2 are disposed on the side of the drive source (not illustrated), in the axial direction, with respect to the planetary gear set PS.

Next, the various portions of the speed change mechanism 2 will be described in detail. The first clutch C-1, which is disposed on the input shaft 3, includes friction plates 11 and a hydraulic servo 10 that engageably connects and disconnects the friction plates 11. The hydraulic servo 10 has a clutch drum 12 provided with a cylinder portion, a piston member 13, a return spring (not illustrated) for pushing back the piston member 13, and a cancellation plate that receives a reaction force of the return spring. The piston member 13 is disposed so as to be movable in the axial direction (left-right direction) with respect to the clutch drum 12 and the input shaft 3, and constitutes a working oil chamber 15 between the input shaft 3 and the clutch drum 12 and the piston member 13 using two seal rings. That is, the working oil chamber 15 is formed on the outer peripheral surface of the input shaft 3. The piston member 13 forms a cancellation oil chamber (not illustrated) that cancels a centrifugal hydraulic pressure between the cancellation plate (not illustrated) and the piston member 13.

The outer friction plates, among the friction plates 11 of the first clutch C-1, are splined to the inner peripheral side of the distal end of the clutch drum 12. Furthermore, the clutch drum 12 is coupled to the input shaft 3. Thus, the outer friction plates of the friction plates 11 of the first clutch C-1 are rotationally coupled to the input shaft 3. Meanwhile, the inner friction plates, among the friction plates 11 of the first clutch C-1, are splined to the outer peripheral side of a hub member drivably coupled to a coupling member 61. The coupling member 61 passes on the inner peripheral side of the counter gear 5 to be coupled to a second sun gear S2 to be discussed later.

The second clutch C-2 is disposed so as to cover the outer peripheral side of the first clutch C-1, and includes friction plates 21 disposed on the outer peripheral side of the friction plates 11 and a hydraulic servo 20 that engageably connects and disconnects the friction plates 21. The hydraulic servo 20 has a clutch drum 22 provided with a cylinder portion, a piston member 23, a return spring (not illustrated) for pushing back the piston member 23, and a cancellation plate that receives a reaction force of the return spring. The piston member 23 is disposed so as to be movable in the axial direction (left-right direction) with respect to the clutch drum 22, and constitutes a working oil chamber 25 between the clutch drum 22 and the piston member 23 using two seal rings. The piston member 23 forms a cancellation oil chamber (not illustrated) that cancels a centrifugal hydraulic pressure between the cancellation plate (not illustrated) and the piston member 23.

The inner friction plates, among the friction plates 21 of the second clutch C-2, are splined to the outer peripheral side of the distal end of the clutch drum 12 of the first clutch C-1. Thus, the inner friction plates of the friction plates 21 of the second clutch C-2 are rotationally coupled to the input shaft 3. Meanwhile, the outer friction plates, among the friction plates 21 of the second clutch C-2, are splined to the inner peripheral side of the distal end of the clutch drum 22. The clutch drum 22 is coupled to a coupling member 62. The coupling member 62 passes on the inner peripheral side of the counter gear 5 to be coupled to a common carrier CR2 to be discussed later.

The second brake B-2, which is disposed so as to cover the outer peripheral side of the second clutch C-2, is disposed along the inner peripheral surface of the transmission case 4, and includes friction plates 41 and a hydraulic servo 40 that lockably connects and disconnects the friction plates 41. The hydraulic servo 40 has a cylinder portion 42 formed on a side surface of the support wall 7, a piston member 43, a return spring (not illustrated) for pushing back the piston member 43 leftward, and a return plate that receives a reaction force of the return spring. The piston member 43 is disposed so as to be movable in the axial direction (left-right direction) with respect to the support wall 7, and constitutes a working oil chamber 45 between the support wall 7 and the piston member 43 using two seal rings.

The outer friction plates, among the friction plates 41 of the second clutch C-2, are splined to the inner peripheral surface of the transmission case 4. That is, the outer friction plates are disposed so as not to be relatively rotatable. Meanwhile, the inner friction plates, among the friction plates 41 of the second brake B-2, are splined to the outer peripheral side of the clutch drum 22 of the second clutch C-2. Thus, the inner friction plates are coupled to the common carrier CR2 to be discussed later via the coupling member 62.

Meanwhile, the first brake B-1, which is disposed on the outer peripheral side so as to cover the speed-reduction planetary gear SP and the third brake B-3, is disposed along the inner peripheral surface of the transmission case 4, and includes friction plates 31 and a hydraulic servo 30 that lockably connects and disconnects the friction plates 31. The hydraulic servo 30 has a cylinder portion 32 formed on the sidewall 4b of the transmission case 4, a piston member 33, a return spring (not illustrated) for pushing back the piston member 33 leftward, and a return plate that receives a reaction force of the return spring. The piston member 33 is disposed so as to be movable in the axial direction (left-right direction) with respect to the sidewall 4b of the transmission case 4, and constitutes a working oil chamber 35 between the sidewall 4b and the piston member 33 using two seal rings.

The outer friction plates, among the friction plates 31 of the first brake B-1, are splined to the inner peripheral surface of the transmission case 4. That is, the outer friction plates are disposed so as not to be relatively rotatable. Meanwhile, the inner friction plates, among the friction plates 31 of the first brake B-1, are splined to the outer peripheral side of a hub member 64 that is coupled to a coupling member 63 and that extends in a tubular shape on the outer peripheral side of the third brake B-3. Thus, the inner friction plates are coupled to an intermediate gear MG and a first carrier CR1 to be discussed later via the coupling member 63 which passes between the third brake B-3 and the planetary gear set PS in the axial direction. The hub member 64 and the coupling member 63 may be an integrally formed member. That is, the hub member 64 may be directly coupled to the first carrier CR1.

The third brake B-3, which is disposed on the outer peripheral side of the speed-reduction planetary gear SP and the inner peripheral side of the first brake B-1, is disposed on the inner peripheral side of a cylindrical portion 4c that extends from the transmission case 4, and includes friction plates 51 and a hydraulic servo 50 that lockably connects and disconnects the friction plates 51. The hydraulic servo 50 has a cylinder portion 52 formed on the sidewall 4b of the transmission case 4, a piston member 53, a return spring (not illustrated) for pushing back the piston member 53 leftward, and a return plate that receives a reaction force of the return spring. The piston member 53 is disposed so as to be movable in the axial direction (left-right direction) with respect to the sidewall 4b of the transmission case 4, and constitutes a working oil chamber 55 between the sidewall 4b and the piston member 53 using two seal rings.

The outer friction plates, among the friction plates 51 of the third brake B-3, are splined to the inner peripheral surface of the cylindrical portion 4c of the transmission case 4. That is, the outer friction plates are disposed so as not to be relatively rotatable. Meanwhile, the inner friction plates, among the friction plates 51 of the third brake B-3, are splined to the outer peripheral side of a first ring gear R1 of the speed-reduction planetary gear SP (possibly via a coupling member). Thus, the inner friction plates are coupled to the first ring gear R1.

The speed-reduction planetary gear SP is a so-called single-pinion planetary gear, and includes a first sun gear S1 (third sun gear), the first ring gear R1 (third ring gear), and the first carrier CR1 which rotatably supports a first pinion P1 (third pinion) meshed with the first sun gear S1 and the first ring gear R1. Among these, the first sun gear S1 is drivably coupled to the input shaft 3, and configured to receive input rotation. In addition, rotation of the first ring gear R1 can be locked by the third brake B-3. In addition, the first carrier CR1 is drivably coupled to the intermediate gear MG, and rotation of the first carrier CR1 can be locked by the first brake B-1. In the speed-reduction planetary gear SP, input rotation is input from the input shaft 3 to the first sun gear S1. When rotation of the first ring gear R1 is locked by the third brake B-3, reduced-speed rotation obtained by reducing the speed of the input rotation is output from the first carrier CR1 to the intermediate gear MG The planetary gear set PS is obtained by combining a single-pinion planetary gear on the inner peripheral side and a single-pinion planetary gear on the outer peripheral side in a two-storied structure, and has: a second sun gear S2 (first sun gear); the integral intermediate gear MG in which a second ring gear R2 (first ring gear) is formed on the outer peripheral side and a third sun gear S3 (second sun gear) is formed on the inner peripheral side; a third ring gear R3 (second ring gear); and the common carrier CR2 which rotatably supports a second pinion P2 (first pinion) and a third pinion P3 (second pinion), the second pinion P2 being meshed with the second sun gear S2 and the second ring gear R2, and the third pinion P3 being meshed with the third sun gear S3 and the third ring gear R3 and disposed so as to be at least partially superposed on the second pinion P2 in the axial direction as viewed from the radial direction.

Among these, the second sun gear S2 can receive input rotation of the input shaft 3 from the first clutch C-1 via the coupling member 61. In addition, the common carrier CR2 can receive input rotation of the input shaft 3 from the second clutch C-2 via the coupling member 62, and rotation of the common carrier CR2 can be locked (stopped) by the second brake B-2. Furthermore, the intermediate gear MG can receive reduced-speed rotation from the speed-reduction planetary gear SP when the third brake B-3 is locked, and rotation of the intermediate gear MG can be locked (stopped) by the first brake B-1. The third ring gear R3 is coupled to the counter gear 5. A gear coupled to the counter shaft (not illustrated) is meshed with a part of the outer peripheral side of the counter gear 5. Furthermore, the counter shaft is coupled to drive wheels via a gear mechanism, a differential gear, and so forth (not illustrated).

Subsequently, operation of the automatic transmission 1 will be described with reference to FIGS. 1 and 2. For example, in the drive (D) range, and when the first forward speed (1st) is established, as illustrated in FIG. 2, the first clutch C-1 and the second brake B-2 are engaged. Then, as illustrated in FIG. 1, rotation of the common carrier CR2 is stopped, and input rotation of the input shaft 3 is input to the second sun gear S2. Consequently, the input rotation of the second sun gear S2 is output to the third ring gear R3 with the speed reduced via the common carrier CR2 which is stationary, and reduced-speed rotation serving as the first forward speed is output from the counter gear 5.

Figure 2:
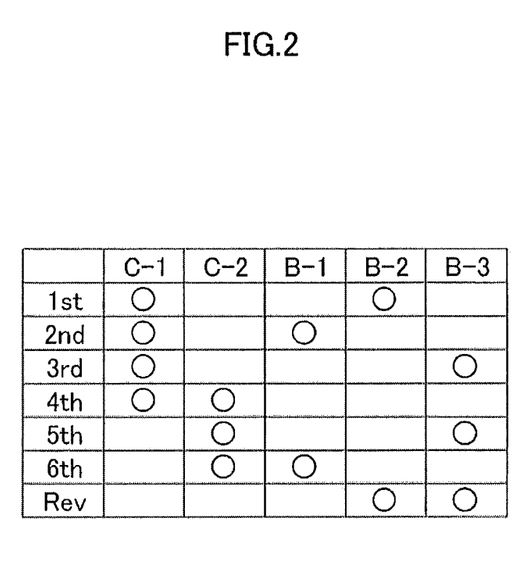
FIG. 2 is an engagement table of the automatic transmission.

When the second forward speed (2nd) is established, as illustrated in FIG. 2, the first clutch C-1 is engaged, and the first brake B-2 is locked. Then, as illustrated in FIG. 1, rotation of the intermediate gear MG (the second ring gear R2 and the third sun gear S3) is stopped, and input rotation is input to the second sun gear S1 Consequently, the common carrier CR2 makes reduced-speed rotation with the input rotation of the second sun gear S2 and with the intermediate gear MG stationary, the third ring gear R3 makes reduced-speed rotation with the common carrier CR2 making reduced-speed rotation and with the input rotation of the second sun gear S2, and reduced-speed rotation serving as the second forward speed is output from the counter gear 5.

When the third forward speed (3rd) is established, as illustrated in FIG. 2, the first clutch C-1 is engaged, and the third brake B-3 is locked. Then, as illustrated in FIG. 1, first, in the speed-reduction planetary gear SP, rotation of the first ring gear R1 is stopped, and input rotation is input to the first sun gear S 1. Consequently, the first carrier CR1 makes reduced-speed rotation with the input rotation of the first sun gear S1 and with the first ring gear R1 stationary. In the planetary gear set PS, in addition, the reduced-speed rotation of the first carrier CR1 is input to the intermediate gear MG, and input rotation is input to the second sun gear S2. Consequently, the common carrier CR2 makes reduced-speed rotation, which is slightly higher in speed than that with the second forward speed, with the input rotation of the second sun gear S2 and with the intermediate gear MG making reduced-speed rotation, the third ring gear R3 makes reduced-speed rotation with the common carrier CR2 making reduced-speed rotation and with the input rotation of the second sun gear S2, and reduced-speed rotation serving as the third forward speed is output from the counter gear 5.

When the fourth forward speed (4th) is established, as illustrated in FIG. 2, the first clutch C-1 and the second clutch C-2 are engaged. Then, as illustrated in FIG. 1, input rotation is input to the second sun gear S2 through engagement of the first clutch C-1, and input rotation is input to the common carrier CR2 through engagement of the second clutch C-2. That is, input rotation is input to the second sun gear S2 and the common carrier CR2. Therefore, the planetary gear set PS is directly coupled to transfer input rotation, and the input rotation is directly output to the third ring gear R3 so that direct-coupling rotation serving as the fourth forward speed is output from the counter gear 5.

When the fifth forward speed (5th) is established, as illustrated in FIG. 2, the second clutch C-2 is engaged, and the third brake B-3 is locked. Then, as illustrated in FIG. 1, first, in the speed-reduction planetary gear SP, rotation of the first ring gear R1 is stopped, and input rotation is input to the first sun gear S 1. Consequently, the first carrier CR1 makes reduced-speed rotation with the input rotation of the first sun gear S1 and with the first ring gear R1 stationary. In the planetary gear set PS, in addition, the reduced-speed rotation of the first carrier CR1 is input to the intermediate gear MG, and input rotation is input to the common carrier CR2. Consequently, the third ring gear R3 makes increased-speed rotation with the input rotation of the common carrier CR2 and with the reduced-speed rotation of the intermediate gear MG, and increased-speed rotation serving as the fifth forward speed is output from the counter gear 5.

When the sixth forward speed (6th) is established, as illustrated in FIG. 2, the second clutch C-2 is engaged, and the first brake B-1 is locked. Then, as illustrated in FIG. 1, rotation of the intermediate gear MG is stopped, and input rotation is input to the common carrier CR2. Consequently, the third ring gear R3 makes increased-speed rotation, which is slightly higher in speed than that with the fifth forward speed, with the input rotation of the common carrier CR2 and with the intermediate gear MG stationary, and increased-speed rotation serving as the sixth forward speed is output from the counter gear 5.

When the reverse speed (Rev) is established, as illustrated in FIG. 2, the second brake B-2 and the third brake B-3 are locked. Then, as illustrated in FIG. 1, first, in the speed-reduction planetary gear SP, rotation of the first ring gear R1 is stopped, and input rotation is input to the first sun gear S1. Consequently, the first carrier CR1 makes reduced-speed rotation with the input rotation of the first sun gear S1 and with the first ring gear R1 stationary. In the planetary gear set PS, in addition, the reduced-speed rotation of the first carrier CR1 is input to the intermediate gear MG, and rotation of the common carrier CR2 is stopped. Consequently, the reduced-speed rotation of the intermediate gear MG is reversed by the common carrier CR2, which is stationary, and output to the third ring gear R3, and reduced-speed reversed rotation serving as the reverse speed is output from the counter gear 5.

<Second Embodiment>

Next, a second embodiment as a design example in which the automatic transmission 1 according to the first embodiment is designed with a detailed structure will be described with reference to FIG. 3. In order to facilitate understanding, in describing the automatic transmission 1 according to the second embodiment, portions that have functions similar to those in the first embodiment are given the same reference symbols to describe the automatic transmission 1 according to the second embodiment.

Figure 3:
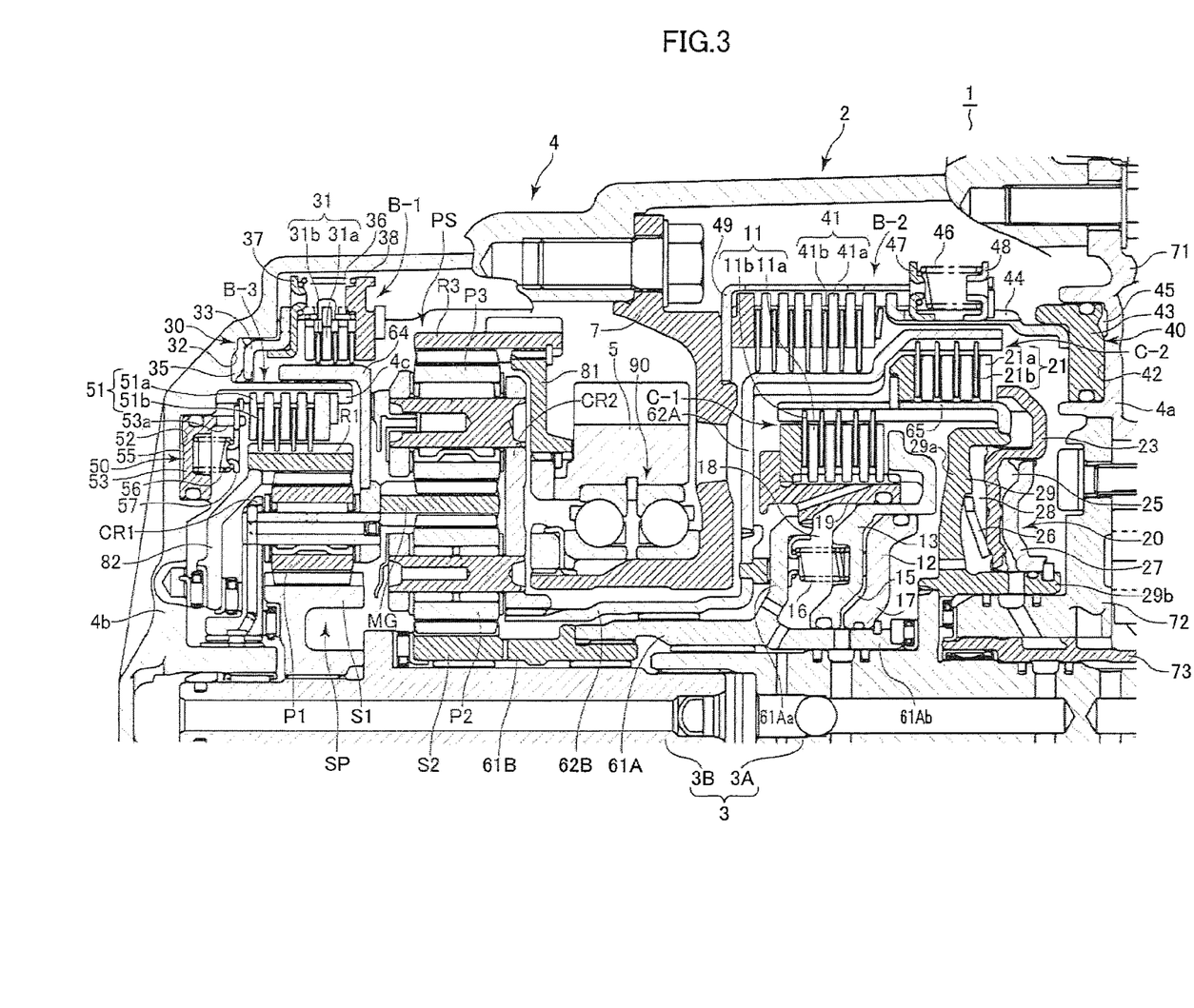
FIG. 3 is a sectional view illustrating an automatic transmission according to a second embodiment.

As illustrated in FIG. 3, the transmission case 4 is open on the right side on which the engine (not illustrated) is disposed. A lid-like member constituted by joining an oil pump body 71, an oil pump cover 72, and a stator shaft 73 is joined to the open portion to constitute a case that houses the speed change mechanism 2 as a whole.

That is, the oil pump body 71, the oil pump cover 72, and the stator shaft 73 constitute the sidewall 4a. The stator shaft 73 is a shaft that supports a stator of the torque converter (not illustrated) via a one-way clutch.

The speed change mechanism 2 is housed in a space closed by the sidewall 4a inside the transmission case 4. The input shaft 3 is rotatably supported by the sidewalls 4a and 4b in the center of the speed change mechanism 2. Specifically, the input shaft 3 has an input shaft 3A connected to the engine via the torque converter or the like (not illustrated) and an intermediate shaft 3B joined to the input shaft 3A through splines to constitute the input shaft 3 in the broad sense.

The first clutch C-1, the second clutch C-2, and the second brake B-2 are disposed, roughly from the inner peripheral side, on the outer peripheral side of the input shaft 3A, that is, on the engine side with respect to the support wall 7. The first clutch C-1 includes the friction plates 11 which are composed of outer friction plates 11a and inner friction plates 11b, and the hydraulic servo 10 which connects and disconnects the friction plates 11. The hydraulic servo 10 is disposed on the outer peripheral side of a boss portion 61Ab, which extends in a boss shape, of a coupling member 61A coupled to the second sun gear S2 via a coupling member 61B and rotatably supported by the input shaft 3A. A flange portion 61Aa, which extends in a flange shape, of the coupling member 61A is constituted as the cancellation plate. The hydraulic servo 10 has the piston member 13, a cylinder plate 17, and a return spring 16 to constitute the working oil chamber 15 and a cancellation oil chamber 18.

The piston member 13 is fitted on the outer peripheral side of the boss portion 61Ab so as to be slidable in the axial direction. Also, the cylinder plate 17 is disposed on the outer peripheral side of the boss portion 61Ab, and fitted so as to be restricted from moving in the axial direction. The cylinder plate 17 is fitted between the piston member 13 and the boss portion 61Ab in the radial direction, and forms the working oil chamber 15 between the piston member 13 and the cylinder plate 17. In addition, the piston member 13 is disposed so as to oppose the flange portion 61Aa. The return spring 16, which is a coil spring, is provided in a contracted state between the flange portion 61 Aa and the piston member 13. Also, the cancellation oil chamber 18 for canceling a centrifugal hydraulic pressure in the working oil chamber 15 is constituted between the flange portion 61Aa and the piston member 13.

The outer peripheral side of the piston member 13 is disposed so as to oppose the friction plates 11, and can press the friction plates 11 on the basis of an engagement pressure supplied to the working oil chamber 15. In addition, the inner friction plates 11b, among the friction plates 11, are splined to a hub member 19. The hub member 19 is secured to the flange portion 61Aa of the coupling member 61A by welding or the like to be supported. Meanwhile, the outer friction plates 11a, among the friction plates 11, are splined to a drum member 65 coupled to the input shaft 3A via a support member 29 as discussed in detail later. The piston member 13 is splined to splines of the hub member 19 from the inner peripheral side to be prevented from rotating with respect to the coupling member 61A.

Thus, the first clutch C-1 engages the friction plates 11 by pressing the friction plates 11 using the piston member 13 on the basis of the engagement pressure supplied to the working oil chamber 15. When the engagement pressure is discharged from the working oil chamber 15, the return spring 16 presses back the piston member 13 to disengage the friction plates 11. When the first clutch C-1 is engaged, the input shaft 3A and the second sun gear S2 are drivably coupled so as not to be relatively rotatable.

The second clutch C-2 includes the friction plates 21 which are composed of outer friction plates 21a and inner friction plates 21b, and the hydraulic servo 20 which connects and disconnects the friction plates 21. The friction plates 21 are disposed on the outer peripheral side and as offset to the engine side (one side), in the axial direction, with respect to the friction plates 11 of the first clutch C-1. The hydraulic servo 20 is disposed side by side on the engine side, in the axial direction, with respect to the first clutch C-1. The hydraulic servo 20 is disposed on the outer peripheral side of a boss portion 29b, which extends in a boss shape, of the support member 29 which is coupled to the input shaft 3A by welding or the like and which is rotatably supported on the outer peripheral side of the oil pump cover 72. A flange portion 29a, which extends in a flange shape, of the support member 29 is constituted as the cancellation plate. The hydraulic servo 20 has the piston member 23, a cylinder plate 27, and a return spring 26 to constitute the working oil chamber 25 and a cancellation oil chamber 28.

The piston member 23 is fitted on the outer peripheral side of the boss portion 29b so as to be slidable in the axial direction. Also, the cylinder plate 27 is disposed on the outer peripheral side of the boss portion 29b, and fitted so as to be restricted from moving in the axial direction. The cylinder plate 27 is fitted between the piston member 23 and the boss portion 29b in the radial direction, and forms the working oil chamber 25 between the piston member 23 and the cylinder plate 27. In addition, the piston member 23 is disposed so as to oppose the flange portion 29a. The return spring 26, which is a plate spring, is provided in a contracted state between the flange portion 29a and the piston member 23. Also, the cancellation oil chamber 28 for canceling a centrifugal hydraulic pressure in the working oil chamber 25 is constituted between the flange portion 29a and the piston member 23.

The outer peripheral side of the piston member 23 is disposed so as to oppose the friction plates 21, and can press the friction plates 21 on the basis of an engagement pressure supplied to the working oil chamber 25. In addition, the inner friction plates 21b, among the friction plates 21, are splined to the drum member 65 which is coupled to the flange portion 29a by welding or the like. Meanwhile, the outer friction plates 21a, among the friction plates 21, are splined to a coupling member 62A coupled to the common carrier CR2 via a coupling member 62B rotatably supported on the outer peripheral side of the coupling member 61A. The piston member 23 is splined to splines of the drum member 65 from the outer peripheral side to be prevented from rotating with respect to the support member 29.

Thus, the second clutch C-2 engages the friction plates 21 by pressing the friction plates 21 using the piston member 23 on the basis of the engagement pressure supplied to the working oil chamber 25. When the engagement pressure is discharged from the working oil chamber 25, the return spring 26 presses back the piston member 23 to disengage the friction plates 21. When the second clutch C-2 is engaged, the input shaft 3A and the common carrier CR2 are drivably coupled so as not to be relatively rotatable.

In the embodiment, the friction plates 11 of the first clutch C-1 and the friction plates 21 of the second clutch C-2 are disposed as offset in the axial direction as viewed from the radial direction. Because the friction plates 11 and the friction plates 21 are disposed with the drum member 65 provided therebetween, however, the friction plates 11 and the friction plates 21 may be disposed as partially superposed in the axial direction (such that at least some of the friction plates 11 and the friction plates 21 are offset), depending on the number of the friction plates. Thus, if at least some of the friction plates 21 of the second clutch C-2 are disposed on one side, in the axial direction, with respect to the friction plates 11 of the first clutch C-1, the friction plates 41 of the second brake B-2 to be discussed later can be disposed side by side, in the axial direction, with the friction plates 21 of the second clutch C-2, which makes the automatic transmission 1 compact in the radial direction.

The second brake B-2 includes the friction plates 41 which are composed of outer friction plates 41a and inner friction plates 41b, and the hydraulic servo 40 which connects and disconnects the friction plates 41. The friction plates 41 are disposed at a position at which the friction plates 41 are superposed on the outer peripheral side of the friction plates 11 of the first clutch C-1 in an overlapping manner, slightly on the outer peripheral side with respect to the friction plates 21 of the second clutch C-2 such that at least some of the friction plates 41 are superposed, in the radial direction, on the friction plates 21 as viewed from the axial direction, and as offset to the support wall 7 side (the other side), in the axial direction, as viewed from the radial direction. The hydraulic servo 40 is disposed so as to utilize a portion of the oil pump body 71, which constitutes the sidewall 4a, on the outer peripheral side with respect to the oil pump cover 72. The inner friction plates 41b, among the friction plates 41, are splined to the outer peripheral side of the coupling member 62A discussed above. Meanwhile, the outer friction plates 41 a are splined to a brake drum 49 secured to the support wall 7.

The hydraulic servo 40 has the cylinder portion 42 which is formed on a side surface of the oil pump body 71, the piston member 43, a return spring 46, and retainer plates 47 and 48. The working oil chamber 45 is constituted between the cylinder portion 42 and the piston member 43. A pressing drum 44 is secured to the piston member 43. The pressing drum 44 is disposed such that the distal end portion of the pressing drum 44 opposes the friction plates 41.

The retainer plates 47 and 48 are fitted to both end portions of the return spring 46. The retainer plates 47 and 48 are splined to the outer peripheral side of the pressing drum 44, and disposed such that the return spring 46 is provided in a contracted state with one retainer plate 47 abutting against the brake drum 49 and with the other retainer plate 48 positioned in the axial direction with respect to the pressing drum 44 by a snap ring or the like.

Thus, the second brake B-2 engages (locks) the friction plates 41 by pressing the friction plates 41 using the piston member 43 and the pressing drum 44 on the basis of the engagement pressure supplied to the working oil chamber 45. When the engagement pressure is discharged from the working oil chamber 45, the return spring 46 presses back the piston member 43 via the pressing drum 44 to disengage the friction plates 41. When the second brake B-2 is engaged, the common carrier CR2 is made stationary via the coupling members 62A and 62B so as not to be relatively rotatable with respect to the transmission case 4 via the brake drum 49 and the support wall 7.

Meanwhile, the speed-reduction planetary gear SP is disposed on the side opposite to the engine side, in the axial direction, with respect to the support wall 7, the counter gear 5, and the planetary gear set PS. The speed-reduction planetary gear SP is a so-called single-pinion planetary gear, and includes the first sun gear S1 (third sun gear), the first ring gear R1 (third ring gear), and the first carrier CR1 which rotatably supports the first pinion P1 (third pinion) which is meshed with the first sun gear S1 and the first ring gear R1.

Among these, the first sun gear S1 is splined to the intermediate shaft 3B, which is coupled to the input shaft 3A, to be drivably coupled to and supported by the intermediate shaft 3B. The first carrier CR1, which rotatably supports the first pinion P1, is rotatably supported by a boss-shaped portion that extends from the sidewall 4b, and secured by welding or the like to the hub member 64, to which the inner friction plates 31b of the friction plates 31 of the first brake B-1 to be discussed later are splined, and the intermediate gear MG of the planetary gear set PS to be discussed later. The first ring gear R1 is secured by welding or the like to a support member 82 formed in a circular plate shape to be supported so as to be rotatable with respect to the sidewall 4b and the first carrier CR1. Inner friction plates 51b of the friction plates 51 of the third brake B-3 to be discussed later are splined to the outer peripheral side of the first ring gear R1. Thus, in the speed-reduction planetary gear SP, input rotation of the input shaft 3A is input from the intermediate shaft 3B to the first sun gear S1. When rotation of the first ring gear R1 is locked by the third brake B-3, reduced-speed rotation obtained by reducing the speed of the input rotation is output from the first carrier CR1 to the intermediate gear MG In the case where rotation of the intermediate gear MG of the planetary gear set PS to be discussed later is locked with the first brake B-1 engaged, rotation of the first carrier CR1 is also locked.

The third brake B-3 is disposed on the outer peripheral side of the speed-reduction planetary gear SP. The third brake B-3 includes the friction plates 51 which are composed of outer friction plates 51a and the inner friction plates 51b, and the hydraulic servo 50 which connects and disconnects the friction plates 51. The outer friction plates 51 a are splined to the cylindrical portion 4c which is formed to extend in a cylindrical shape in the axial direction from the sidewall 4b of the transmission case 4. Meanwhile, the inner friction plates 51b are directly splined to the outer peripheral side of the first ring gear R1. The hydraulic servo 50 has the cylinder portion 52 which is formed on a side surface of the sidewall 4b of the transmission case 4, the piston member 53, a return spring 56, and a retainer plate 57. The working oil chamber 55 is constituted between the cylinder portion 52 and the piston member 53. The piston member 53 is provided with a pressing portion 53a that is formed in a comb teeth shape and that opposes the friction plates 51 via a through hole formed in the retainer plate 57. The return spring 56 is provided in a contracted state between the piston member 53 and the retainer plate 57.

Thus, the third brake B-3 engages (locks) the friction plates 51 by pressing the friction plates 51 using the pressing portion 53a of the piston member 53 on the basis of the engagement pressure supplied to the working oil chamber 55. When the engagement pressure is discharged from the working oil chamber 55, the return spring 56 presses back the piston member 53 to disengage the friction plates 51. When the first brake B-1 is engaged, the first ring gear R1 is made stationary so as not to be relatively rotatable with respect to the transmission case 4 via the cylindrical portion 4c.

The first brake B-1 is disposed on the outer peripheral side of the third brake B-3. The first brake B-1 includes the friction plates 31 which are composed of outer friction plates 31a and the inner friction plates 31b, and the hydraulic servo 30 which connects and disconnects the friction plates 31. The outer friction plates 31a are directly splined to the transmission case 4. Meanwhile, the inner friction plates 31b are splined to the hub member 64 which is coupled to the first carrier CR1 and the intermediate gear MG The hydraulic servo 30 has the cylinder portion 32 which is formed on a side surface of the sidewall 4b of the transmission case 4, the piston member 33, a return spring 36, a retainer plate 37, and an end plate 38. The working oil chamber 35 is constituted between the cylinder portion 32 and the piston member 33. The piston member 33 is disposed such that the distal end portion of the piston member 33 abuts against the retainer plate 37, and configured to be able to press the friction plates 31 via the retainer plate 37. The return spring 36 is provided in a contracted state as stored in spline grooves of the transmission case 4, between the retainer plate 37 and the end plate 38 and on the outer peripheral side of the friction plates 31.

Thus, the first brake B-1 engages (locks) the friction plates 31 by pressing the friction plates 31 using the piston member 33 via the retainer plate 37 on the basis of the engagement pressure supplied to the working oil chamber 35. When the engagement pressure is discharged from the working oil chamber 35, the return spring 36 presses back the piston member 33 and the retainer plate 37 to disengage the friction plates 31. When the first brake B-1 is engaged, the first carrier CR1 and the intermediate gear MG are made stationary so as not to be rotatable with respect to the transmission case 4.

The planetary gear set PS is disposed between: the speed-reduction planetary gear SP, the third brake B-3, and the first brake B-1; and the support wall 7 and the counter gear 5 in the axial direction. The planetary gear set PS is obtained by combining a single-pinion planetary gear on the inner peripheral side and a single-pinion planetary gear on the outer peripheral side in a two-storied structure, and includes: the second sun gear S2 (first sun gear); the intermediate gear MG in which the second ring gear R2 (first ring gear) is integrally formed on the outer peripheral side and the third sun gear S3 (second sun gear) is integrally formed on the inner peripheral side; the third ring gear R3 (second ring gear); and the common carrier CR2 which rotatably supports the second pinion P2 (first pinion) and the third pinion P3 (second pinion), the second pinion P2 being meshed with the second sun gear S2 and the second ring gear R2, and the third pinion P3 being meshed with the third sun gear S3 and the third ring gear R3 and disposed so as to be at least partially superposed on the second pinion P2 in the axial direction as viewed from the radial direction.

Among these, the second sun gear S2 is formed integrally with the coupling member 61B, and can receive input rotation of the input shaft 3A via the coupling member 61 through engagement of the first clutch C-1. In addition, the common carrier CR2 is splined to and supported by the coupling member 62B, and can receive input rotation of the input shaft 3A via the coupling member 62A through engagement of the second clutch C-2, and rotation of the common carrier CR2 can be locked by the second brake B-2. Furthermore, the intermediate gear MG is secured to and supported by the first carrier CR1 as discussed above, and can receive reduced-speed rotation from the first carrier CR1 through locking of the third brake B-3, and rotation of the intermediate gear MG can be locked (stopped) by the first brake B-1. The third ring gear R3 is coupled to and supported by the counter gear 5 via a coupling member 81.

The counter gear 5 is supported by an angular ball bearing 90 so as to be rotatable with respect to the support wall 7 and so as not to be movable in the axial direction. A gear coupled to the counter shaft (not illustrated) is meshed with a part of the outer peripheral side of the counter gear 5. Furthermore, the counter shaft is coupled to drive wheels via a gear mechanism, a differential gear, and so forth (not illustrated).

The automatic transmission 1 according to the second embodiment described above is only slightly different in structure and support relationship of the members from the automatic transmission 1 according to the first embodiment, and similar in action etc. at the time of power transfer with each shift speed to the automatic transmission 1 according to the first embodiment. Thus, the action etc. at the time of power transfer with each shift speed will not described.

<Summation of First and Second Embodiments>

The automatic transmission 1 described above (see FIGS. 1 and 2, for example) includes:

a reduced-speed rotation output portion (SP, B-3) that outputs input rotation of an input member (3) with a speed of the input rotation reduced;

a planetary gear set (PS) that has a first sun gear (S2), an integral intermediate gear (MG) in which a first ring gear (R2) is formed on an inner peripheral side and a second sun gear (S3) is formed on an outer peripheral side, a second ring gear (R3), and a common carrier (CR2) that rotatably supports a first pinion (P2) and a second pinion (P3), the first pinion (P2) being meshed with the first sun gear (S2) and the first ring gear (R2), and the second pinion (P3) being meshed with the second sun gear (S3) and the second ring gear (R3) and disposed so as to be at least partially superposed on the first pinion (P2) in an axial direction as viewed from a radial direction;

a first clutch (C-1) capable of engaging the first sun gear (S2) and the input member (3) with each other;

a second clutch (C-2) capable of engaging the common carrier (CR2) and the input member (3) with each other;

a first brake (B-1) capable of locking rotation of the intermediate gear (MG);

a second brake (B-2) capable of locking rotation of the common carrier (CR2); and an output member (5) drivably coupled to the second ring gear (R3) to output rotation, and wherein:

the reduced-speed rotation output portion (SP, B-3) and the first brake (B-1) are disposed on one side, in the axial direction, of the planetary gear set (PS);

the output member (5) is disposed on the other side, in the axial direction, of the planetary gear set (PS);

the first clutch (C-1), the second clutch (C-2), and the second brake (B-2) are disposed on a side of the output member (5) opposite to the planetary gear set (PS) in the axial direction;

the first brake (B-1) is disposed on an outer peripheral side of the reduced-speed rotation output portion (SP, B-3); and the second brake (B-2) is disposed on an outer peripheral side of the first clutch (C-1) and the second clutch (C-2).

Consequently, the speed-reduction planetary gear SP and the third brake B-3, which serve as the reduced-speed rotation output portion, are disposed on one side (left side), in the axial direction, of the planetary gear set PS, and the counter gear 5 is disposed on the other side (right side), in the axial direction, of the planetary gear set PS. Thus, the speed-reduction planetary gear SP and the planetary gear set PS can be disposed close to each other without the counter gear 5 interposed between the speed-reduction planetary gear SP and the planetary gear set PS in the axial direction, which makes it possible to shorten the member which transfers reduced-speed rotation and make the automatic transmission 1 compact and lightweight. In addition, the first brake B-1 is disposed on the outer peripheral side of the speed-reduction planetary gear SP and the third brake B-3, and the second brake B-2 is disposed on the outer peripheral side of the first clutch C-1 and the second clutch C-2. Thus, the automatic transmission 1 can be made compact in the radial direction without disposing the first brake B-1 and the second brake B-2 on the outer peripheral side of the planetary gear set PS.

The automatic transmission (1) wherein
the reduced-speed rotation output portion includes a single-pinion speed-reduction planetary gear (SP) that has a third sun gear (S1) drivably coupled to the input member (3), a third ring gear (R1), and a carrier (CR1) that rotatably supports a third pinion (P1) meshed with the third sun gear (S3) and the third ring gear (R1), and a third brake (B-3) capable of locking rotation of the third ring gear (R1);

a first forward speed is established by engaging the first clutch (C-1) and the second brake (B-2);

a second forward speed is established by engaging the first clutch (C-1) and the first brake (B-1);

a third forward speed is established by engaging the first clutch (C-1) and the third brake (B-3);

a fourth forward speed is established by engaging the first clutch (C-1) and the second clutch (C-2);

a fifth forward speed is established by engaging the second clutch (C-2) and the third brake (B-3);

a sixth forward speed is established by engaging the second clutch (C-2) and the first brake (B-1); and a reverse speed is established by engaging the second brake (B-2) and the third brake (B-3).

Consequently, multi-stage speed change with six forward speeds and one reverse speed can be obtained.

The automatic transmission (1) wherein a working oil chamber (15) of a hydraulic servo (10) of the first clutch (C-1) is formed on an outer peripheral surface of the input member (3).

Consequently, the first clutch C-1 can be made smaller in diameter, the second clutch C-2 can also be made smaller in diameter, and the second brake B-2, which is engaged to establish the first forward speed and the reverse speed, for example, and therefore, to which large torque is assigned, can be disposed on the outer peripheral side of the first clutch C-1 and the second clutch C-2. This eliminates the need to dispose the second brake B-2 on the outer peripheral side of the planetary gear set PS, which makes it possible to make the automatic transmission 1 compact in the radial direction.

Friction plates (21) of the second clutch (C-2) are disposed on an outer peripheral side of friction plates (11) of the first clutch (C-1) and such that at least some of the friction plates (21) of the second clutch (C-2) are offset to the other side, in the axial direction, with respect to the friction plates (11) of the first clutch (C-1) as viewed in the radial direction; and friction plates (41) of the second brake (B-2) are disposed such that at least some of the friction plates (41) of the second brake (B-2) are superposed, in the radial direction, on the friction plates (21) of the second clutch (C-2) as viewed from the axial direction and so as to be offset to one side, in the axial direction, with respect to the friction plates (21) of the second clutch (C-2) as viewed from the radial direction.

Consequently, the friction plates 11 of the first clutch C-1, the friction plates 21 of the second clutch C-2, and the friction plates 41 of the second brake B-2 can be disposed alternately in the axial direction in a staggered manner, which makes the automatic transmission 1 compact in the radial direction.

In the automatic transmission (1), the first clutch (C-1), the second clutch (C-2), and the second brake (B-2) are disposed on a side of a drive source, in the axial direction, with respect to the planetary gear set (PS).

Consequently, the second brake B-2 can be disposed in a portion of the automatic transmission 1 on the side of the drive source, on which the degree of freedom in design in the radial direction is high compared to a portion of the automatic transmission 1 on the side opposite to the drive source, which makes the portion of the automatic transmission 1 on the side opposite to the drive source compact in the radial direction. This enables securing clearance from vehicle components, and improves the vehicle mountability.

The automatic transmission (1) wherein the reduced-speed rotation output portion includes a single-pinion speed-reduction planetary gear (SP) that has a third sun gear (S1) drivably coupled to the input member (3), a third ring gear (R1), and a carrier (CR1) that rotatably supports a third pinion (P1) meshed with the third sun gear (S3) and the third ring gear (R1), and a third brake (B-3) capable of locking rotation of the third ring gear (R1);

the automatic transmission (1) has a hub member (64) that extends to an outer peripheral side of the third brake (B-3) and that passes between the third brake (B-3) and the planetary gear set (PS) in the axial direction to be drivably coupled to the carrier (CR1); and friction plates (31) of the first brake (B-1) are disposed on an outer peripheral side of the hub member (64).

Consequently, the first brake B-1 and the third brake B-3 can be disposed in a so-called two-storied structure, which makes the automatic transmission 1 compact in the axial direction. In the case where a portion in which the first brake B-1 and the third brake B-3 are disposed is a portion of the automatic transmission 1 on the side opposite to the drive source, in addition, the first brake B-1 is not engaged to establish the first forward speed or the reverse speed and therefore small torque is assigned to the first brake B-1, and the diameter and the number of the friction plates 31 can be made smaller to shorten the first brake B-1 in the axial direction. Thus, a portion of the automatic transmission 1 on the side opposite to the drive source can be made compact in the radial direction. In addition, an inclined surface can be formed at an end portion in the axial direction so as to become gradually smaller in diameter in the radial direction. This enables securing clearance from vehicle components, and improves the vehicle mountability.

The automatic transmission (1) wherein a cylinder portion (32) of a hydraulic servo (30) of the first brake (B-1) and a cylinder portion (52) of a hydraulic servo (50) of the third brake (B-3) are formed on an inner surface of a sidewall (4b) of a case (4) on a side opposite to the planetary gear set (PS) in the axial direction.

Consequently, the cylinder portions 32 and 52 of the two brakes can be formed by utilizing the sidewall 4b of the transmission case 4, which eliminates the need to provide another member to form the cylinder portions 32 and 52, and makes the automatic transmission 1 compact in the axial direction.

In the first and second embodiments described above, the automatic transmission 1 is suitable for use in FF vehicles. However, the present disclosure is not specifically limited thereto, and the automatic transmission 1 may also be used in rear-engine rear-drive (RR) vehicles, for example.

It should be understood that the automatic transmission 1 described in relation to the first and second embodiments can be used not only for vehicles on which only an engine is mounted as a drive source, for example, but also for hybrid vehicles or the like on which an electric motor or the like is mounted.

In the automatic transmission 1 described in relation to the first and second embodiments, it is assumed that a torque converter is disposed between the engine and the automatic transmission 1. However, the present disclosure is not limited thereto, and a starting device that has a starting clutch or the like may also be used.

INDUSTRIAL APPLICABILITY

The automatic transmission can be mounted on vehicles such as passenger cars and trucks. In particular, the present disclosure is suitable for use in automatic transmissions that are desired to be made compact while enabling multi-stage speed change.

The invention claimed is:

1. An automatic transmission comprising:
    a reduced-speed rotation output portion that outputs input rotation of an input member with a speed of the input rotation reduced;
    a planetary gear set that has a first sun gear, an integral intermediate gear in which a first ring gear is formed on an inner peripheral side and a second sun gear is formed on an outer peripheral side, a second ring gear, and a common carrier that rotatably supports a first pinion and a second pinion, the first pinion being meshed with the first sun gear and the first ring gear, and the second pinion being meshed with the second sun gear and the second ring gear and disposed so as to be at least partially superposed on the first pinion in an axial direction as viewed from a radial direction;
    a first clutch capable of engaging the first sun gear and the input member with each other;
    a second clutch capable of engaging the common carrier and the input member with each other;
    a first brake capable of locking rotation of the intermediate gear;
    a second brake capable of locking rotation of the common carrier; and
    an output member drivably coupled to the second ring gear to output rotation, wherein:

the reduced-speed rotation output portion and the first brake are disposed on one side, in the axial direction, of the planetary gear set;

the output member is disposed on the other side, in the axial direction, of the planetary gear set;

the first clutch, the second clutch, and the second brake are disposed on a side of the output member opposite to the planetary gear set in the axial direction;

the first brake is disposed on an outer peripheral side of the reduced-speed rotation output portion; and the second brake is disposed on an outer peripheral side of the first clutch and the second clutch.

2. The automatic transmission according to claim 1, wherein:

the reduced-speed rotation output portion includes a single-pinion speed-reduction planetary gear that has a third sun gear drivably coupled to the input member, a third ring gear, and a carrier that rotatably supports a third pinion meshed with the third sun gear and the third ring gear, and a third brake capable of locking rotation of the third ring gear;

a first forward speed is established by engaging the first clutch and the second brake;

a second forward speed is established by engaging the first clutch and the first brake;

a third forward speed is established by engaging the first clutch and the third brake;

a fourth forward speed is established by engaging the first clutch and the second clutch;

a fifth forward speed is established by engaging the second clutch and the third brake;

a sixth forward speed is established by engaging the second clutch and the first brake; and a reverse speed is established by engaging the second brake and the third brake.

3. The automatic transmission according to claim 2, wherein a working oil chamber of a hydraulic servo of the first clutch is formed on an outer peripheral surface of the input member.

4. The automatic transmission according to claim 3, wherein friction plates of the second clutch are disposed on an outer peripheral side of friction plates of the first clutch and such that at least some of the friction plates of the second clutch are offset to the other side, in the axial direction, with respect to the friction plates of the first clutch as viewed in the radial direction; and friction plates of the second brake are disposed such that at least some of the friction plates of the second brake are superposed, in the radial direction, on the friction plates of the second clutch as viewed from the axial direction and so as to be offset to one side, in the axial direction, with respect to the friction plates of the second clutch as viewed from the radial direction.

5. The automatic transmission according to claim 4, wherein the first clutch, the second clutch, and the second brake are disposed on a side of a drive source, in the axial direction, with respect to the planetary gear set.

6. The automatic transmission according to claim 5, wherein the reduced-speed rotation output portion includes a single-pinion speed-reduction planetary gear that has a third sun gear drivably coupled to the input member, a third ring gear, and a carrier that rotatably supports a third pinion meshed with the third sun gear and the third ring gear, and a third brake capable of locking rotation of the third ring gear;

the automatic transmission has a hub member that extends to an outer peripheral side of the third brake and that passes between the third brake and the planetary gear set in the axial direction to be drivably coupled to the carrier; and friction plates of the first brake are disposed on an outer peripheral side of the hub member.

7. The automatic transmission according to claim 6, wherein a cylinder portion of a hydraulic servo of the first brake and a cylinder portion of a hydraulic servo of the third brake are formed on an inner surface of a sidewall of a case on a side opposite to the planetary gear set in the axial direction.

8. The automatic transmission according to claim 1, wherein a working oil chamber of a hydraulic servo of the first clutch is formed on an outer peripheral surface of the input member.

9. The automatic transmission according to claim 8, wherein friction plates of the second clutch are disposed on an outer peripheral side of friction plates of the first clutch and such that at least some of the friction plates of the second clutch are offset to the other side, in the axial direction, with respect to the friction plates of the first clutch as viewed in the radial direction; and friction plates of the second brake are disposed such that at least some of the friction plates of the second brake are superposed, in the radial direction, on the friction plates of the second clutch as viewed from the axial direction and so as to be offset to one side, in the axial direction, with respect to the friction plates of the second clutch as viewed from the radial direction.

10. The automatic transmission according to claim 9, wherein the first clutch, the second clutch, and the second brake are disposed on a side of a drive source, in the axial direction, with respect to the planetary gear set.

11. The automatic transmission according to claim 10, wherein:

the reduced-speed rotation output portion includes a single-pinion speed-reduction planetary gear that has a third sun gear drivably coupled to the input member, a third ring gear, and a carrier that rotatably supports a third pinion meshed with the third sun gear and the third ring gear, and a third brake capable of locking rotation of the third ring gear;

the automatic transmission has a hub member that extends to an outer peripheral side of the third brake and that passes between the third brake and the planetary gear set in the axial direction to be drivably coupled to the carrier; and friction plates of the first brake are disposed on an outer peripheral side of the hub member.

12. The automatic transmission according to claim 11, wherein a cylinder portion of a hydraulic servo of the first brake and a cylinder portion of a hydraulic servo of the third brake are formed on an inner surface of a sidewall of a case on a side opposite to the planetary gear set in the axial direction.

13. The automatic transmission according to claim 1, wherein:

friction plates of the second clutch are disposed on an outer peripheral side of friction plates of the first clutch and such that at least some of the friction plates of the second clutch are offset to the other side, in the axial direction, with respect to the friction plates of the first clutch as viewed in the radial direction; and friction plates of the second brake are disposed such that at least some of the friction plates of the second brake are superposed, in the radial direction, on the friction plates of the second clutch as viewed from the axial direction and so as to be offset to one side, in the axial direction, with respect to the friction plates of the second clutch as viewed from the radial direction.

14. The automatic transmission according to claim 13, wherein the first clutch, the second clutch, and the second brake are disposed on a side of a drive source, in the axial direction, with respect to the planetary gear set.

15. The automatic transmission according to claim 14, wherein:

the reduced-speed rotation output portion includes a single-pinion speed-reduction planetary gear that has a third sun gear drivably coupled to the input member, a third ring gear, and a carrier that rotatably supports a third pinion meshed with the third sun gear and the third ring gear, and a third brake capable of locking rotation of the third ring gear;

the automatic transmission has a hub member that extends to an outer peripheral side of the third brake and that passes between the third brake and the planetary gear set in the axial direction to be drivably coupled to the carrier; and friction plates of the first brake are disposed on an outer peripheral side of the hub member.

16. The automatic transmission according to claim 15, wherein a cylinder portion of a hydraulic servo of the first brake and a cylinder portion of a hydraulic servo of the third brake are formed on an inner surface of a sidewall of a case on a side opposite to the planetary gear set in the axial direction.

* * * * *